(12) United States Patent
Mishra et al.

(10) Patent No.: US 12,107,642 B2
(45) Date of Patent: Oct. 1, 2024

(54) SYSTEM AND METHOD FOR DEMODULATION AND DECODING OF POWER LINE COMMUNICATIONS

(71) Applicant: Bendix Commercial Vehicle Systems LLC, Avon, OH (US)

(72) Inventors: Akshay Mishra, Kanpur (IN); Amit Babalal Nahar, Pune (IN); Pratima Vishwakarma, Pune (IN); Dattatray Jadhav, Aurangabad (IN); Michael D. Cremona, Lakewood, OH (US); Tandi Wijaya, Highland Heights, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 59 days.

(21) Appl. No.: 18/297,692

(22) Filed: Apr. 10, 2023

(65) Prior Publication Data
US 2024/0291515 A1    Aug. 29, 2024

(30) Foreign Application Priority Data
Feb. 23, 2023 (IN) .............................. 202341012324

(51) Int. Cl.
*H04L 12/403* (2006.01)
*H04B 3/54* (2006.01)
*H04L 27/10* (2006.01)

(52) U.S. Cl.
CPC ........... *H04B 3/542* (2013.01); *H04L 27/103* (2013.01)

(58) Field of Classification Search
CPC .. H04B 17/309; H04B 17/318; H04B 17/345; H04B 17/29; H04B 17/40; H04B 17/23;
(Continued)

(56) References Cited

U.S. PATENT DOCUMENTS

2012/0320996 A1* 12/2012 Dabak ................... H04B 3/54
                                                                    375/257
2017/0215162 A1* 7/2017 Lee .................... H04L 27/2601
(Continued)

OTHER PUBLICATIONS

Intellon Corporation, "Technical Data Sheet—SSC P485 Pl Transceiver IC" (Jul. 1998).
(Continued)

*Primary Examiner* — Eva Y Puente
(74) *Attorney, Agent, or Firm* — Reising Ethington P.C.

(57) ABSTRACT

A system for demodulating and decoding received messages transmitted along a vehicle power line includes a reference signal generator, a timer, and a demodulation and decoding circuit. The circuit determines whether a message is present on the power line by identifying a symbol indicative of a message preamble, subsequently setting the timer to a time corresponding to a predetermined length of the message preamble, detecting, during the time, a plurality of symbols and determining whether the symbols indicate the presence of a message preamble. The circuit then extracts data from the message by activating the reference signal generator, adding the reference signal to the message to produce an equivalent signal, detecting a symbol in the equivalent signal indicative of the message data body, subsequently setting the timer to a time corresponding to a predetermined length of the message data body and detecting, during the time, a second plurality of symbols.

18 Claims, 6 Drawing Sheets

(58) Field of Classification Search
CPC .. H04B 17/26; H04B 3/54; H04L 1/18; H04L 67/12; H04L 1/0041; H04L 1/0002; H04L 5/0064; H04L 67/1097; H04L 1/0009; H04L 67/306; H04L 1/1874; H04W 4/80; H04W 84/18; H04W 72/23; H04W 4/06; H04W 72/044; H04W 72/30; H04W 84/12; H04W 4/70; H04W 52/42
USPC ........................................................ 375/257
See application file for complete search history.

(56) References Cited

U.S. PATENT DOCUMENTS

| | | | |
|---|---|---|---|
| 2018/0295000 A1* | 10/2018 | Jiang | H04B 1/69 |
| 2019/0245583 A1* | 8/2019 | Trebosc | H04L 27/2601 |
| 2021/0229510 A1* | 7/2021 | Balton | H04N 7/183 |
| 2022/0060039 A1* | 2/2022 | Bang | H04B 1/3827 |

OTHER PUBLICATIONS

Zoubir, Mohamed, et al., "A Power Line Communication Control Scheme for Electrical Energy Management," 26 Advances in Energy Planning, Environmental Education and Renewable Energy Sources pp. 160-165 (2010).

* cited by examiner

FIG. 1

| Logic Symbol | Waveform |
|---|---|
| Superiorθ1 |  |
| Superiorθ2 | |
| Inferior | |

SYSTEM AND METHOD FOR DEMODULATION AND DECODING OF POWER LINE COMMUNICATIONS

BACKGROUND OF THE INVENTION a. Field of the Invention

This invention relates to communications systems used in vehicles such as tractor-trailers. In particular, the invention relates to a system and method for demodulating and decoding received messages transmitted along a power line within a vehicle.

b. Background Art

Power line communication (PLC) is a communication method in which data is transmitted over wires that are also used to deliver electric power. The data is encoded within a signal that is transmitted over the wires in frequency ranges outside of those used to transmit electric power. PLC is advantageous relative to other communication methods because it enables communication using existing wiring. Tractor-trailers frequently employ PLC to exchange messages between members of the tractor-trailer including, for example, sensor readings from vehicle systems including anti-lock braking systems, collision avoidance systems, tire pressure monitoring systems and other vehicle systems as well as commands used to control anti-lock braking systems, lighting systems and other vehicle systems.

Tractor-trailers that implement PLC typically employ transceivers to interface between the vehicle power line and microprocessors and other electronic control systems used in the vehicle. The transceiver commonly used in the industry is a proprietary integrated circuit offered for sale by Qualcomm Atheros, Inc. under the name "SSC P485 PL Transceiver IC" that is intended to implement a communications protocol developed by the Society of Automotive Engineers (SAE) set forth in a document number J2497 and titled "Power Line Carrier Communications for Commercial Vehicles." The supply of the P485 chip is limited, however, and the P485 chip is relatively expensive.

The inventors herein have recognized a need for a system and method for demodulating and decoding received messages transmitted along a power line within a vehicle that will minimize and/or eliminate one or more of the above-identified deficiencies.

BRIEF SUMMARY OF THE INVENTION

This invention relates to communications systems used in vehicles such as tractor-trailers. In particular, the invention relates to a system and method for demodulating and decoding received messages transmitted along a power line within a vehicle.

One embodiment of a system for demodulating and decoding received messages transmitted along a power line within a vehicle includes a reference signal generator configured to generate a reference signal, a timer and a demodulation and decoding circuit. The circuit is configured to determine whether a message is present on the power line by detecting a first logic symbol on the power line indicative of a beginning of a preamble of the message, initiating the timer responsive to detection of the first logic symbol, the timer set to a first time corresponding to a predetermined length of the preamble of the message, detecting, during the first time, a first plurality of logic symbols, and determining whether the first plurality of logic symbols is indicative of the presence of the preamble of the message. The circuit is further configured to extract data from a data body of the message if the first plurality of logic symbols is indicative of the presence of the preamble of the message by activating the reference signal generator, combining the reference signal with the message to produce an equivalent signal, detecting a second logic symbol in the equivalent signal indicative of a beginning of the data body of the message, initiating the timer responsive to detection of the second logic symbol, the timer set to a second time corresponding to a predetermined length of the data body of the message, and detecting, during the second time, a second plurality of logic symbols.

One embodiment of a method for demodulating and decoding received messages transmitted along a power line within a vehicle includes determining whether a message is present on the power line by detecting a first logic symbol on the power line indicative of a beginning of a preamble of the message, initiating a timer responsive to detection of the first logic symbol, the timer set to a first time corresponding to a predetermined length of the preamble of the message, detecting, during the first time, a first plurality of logic symbols, and determining whether the first plurality of logic symbols is indicative of the presence of the preamble of the message. The method further includes extracting data from a data body of the message if the first plurality of logic symbols is indicative of the presence of the preamble of the message by activating a reference signal generator configured to generate a reference signal, combining the reference signal with the message to produce an equivalent signal, detecting a second logic symbol in the equivalent signal indicative of a beginning of the data body of the message, initiating the timer responsive to detection of the second logic symbol, the timer set to a second time corresponding to a predetermined length of the data body of the message, and detecting, during the second time, a second plurality of logic symbols.

A system and method for demodulating and decoding received messages transmitted along a power line within a vehicle in accordance the present teachings represent an improvement as compared to conventional systems and methods. In particular, the system and method disclosed herein enable a vehicle to receive messages along the power line without use of the typical transceiver used within the industry that is in short supply and relatively expensive.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
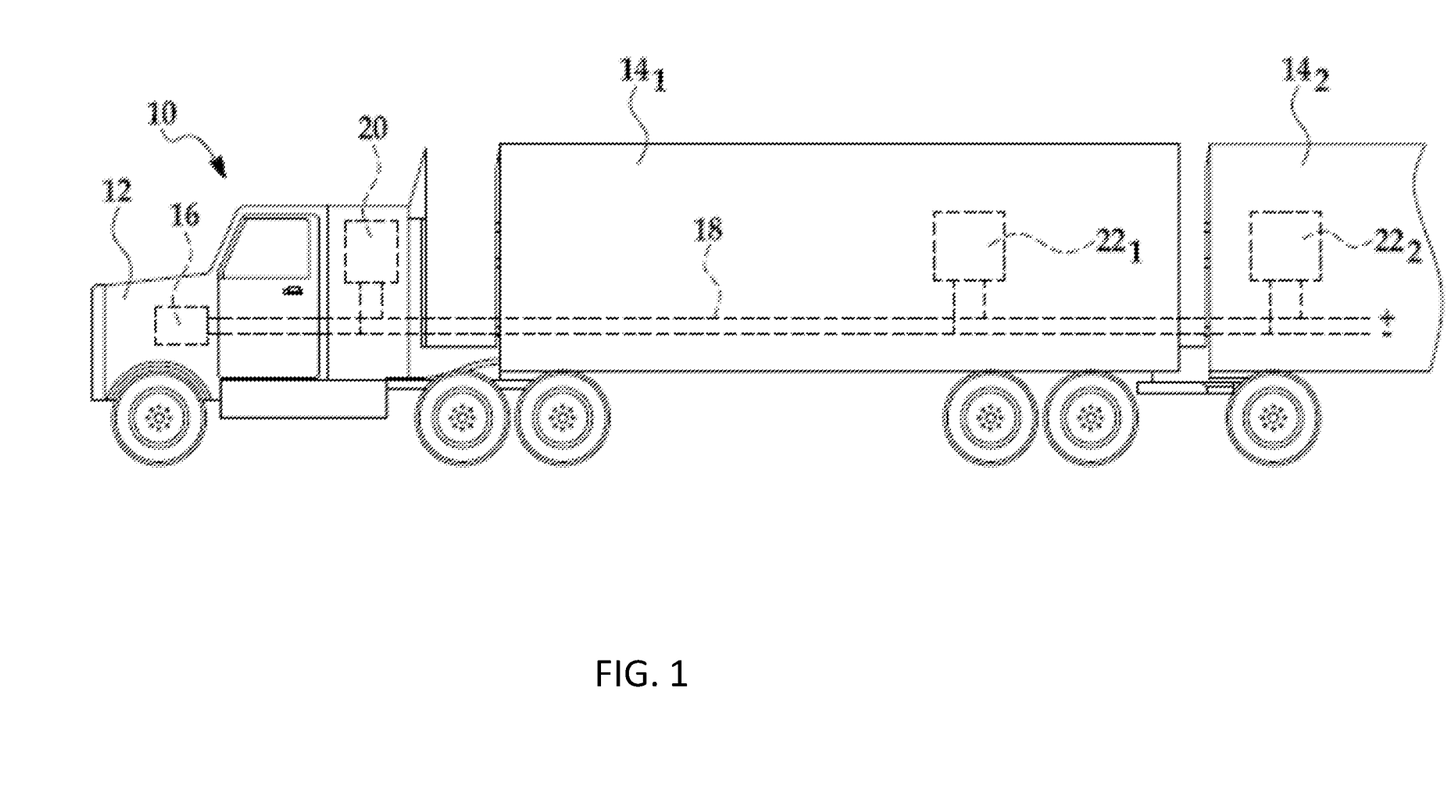
FIG. 1 is a diagrammatic view of a vehicle including a plurality of electronic systems communicating along a power line in the vehicle.

Referring now to the drawings wherein like reference numerals are used to identify identical components in the various views, FIG. 1 illustrates a tractor-trailer 10. Tractor-trailer 10 (also referred to as a semi) contains a truck or tractor 12 and one or more trailers $14_1 \ldots 14_N$. Tractor 12 contains a power unit, such as an internal combustion engine, and steering and drive axles. Tractor 12 also contains a battery 16 for use in starting the power unit and in providing power to various accessory systems. Trailers $14_1 \ldots 14_N$ are provided to store freight and are detachably coupled to tractor 12. Although a pair of trailers 14 are shown in the illustrated embodiment, it should be understood that the number of trailers 14 attached to tractor 12 may vary.

Tractor 12 and trailers 14 may include various fluid and power lines that extend between tractor 12 and trailers 14 including power line 18. The fluid and power lines allow delivery of fluids and electrical power from tractor 12 to trailers 14 for use in, for example, tire pressure management, braking, and activation of tail lights on trailer 14. Power line 18 also forms part of a network used to transmit communications between various electronic systems 20, $22_1 \ldots 22_N$ on tractor 12 and trailers 14, respectively. Systems 20, 22 may comprise any of a wide variety of systems commonly employed on tractor-trailer 10 including, for example, anti-lock braking systems, collision avoidance systems, tire pressure monitoring and control systems, trailer load monitoring systems, and lighting systems. Power line 18 may enable transmission of data from one or more systems 22 on trailers 14 to a system 20 on tractor 12 including, for example, sensor readings indicative of the operation of an anti-lock braking system, the location of surrounding vehicles and infrastructure, pressure within the tires on a trailer 14, or a shift in the load carried by a trailer 14. Power line 18 may also enable transmission of commands and data from tractor 12 to trailers 14 for use in controlling elements of an anti-lock braking system, tire pressure control system or lighting system on one or more of trailers 14.

Figure 2A:
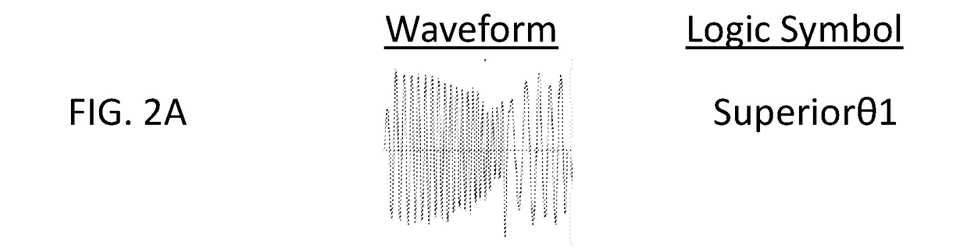
FIGS. 2A-2C are waveform diagrams illustrating logic symbols from a communication protocol used to encode messages transmitted along the power line of the vehicle.
Figure 2B:
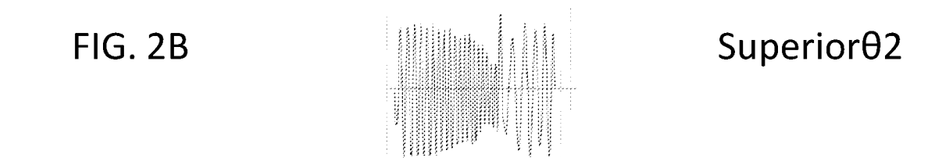
Figure 2C:
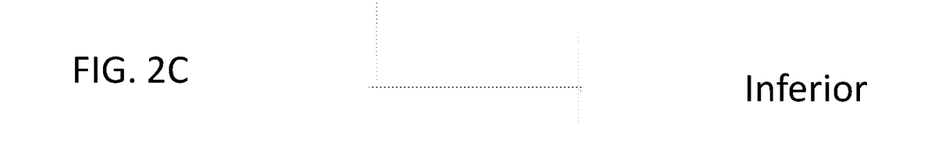

Messages containing data and/or commands may be transmitted along power line 18 between systems 20, 22 using the communications protocol developed by the Society of Automotive Engineers (SAE) and set forth in the document number J2497 and titled "Power Line Carrier Communications for Commercial Vehicles." In accordance with this protocol, messages may be encoded using chirp spread spectrum (CSS) modulation. In particular, a chirp generator will generate specific waveforms corresponding to pre-defined logic symbols that may be interpreted as one of two binary states. Referring to FIGS. 2A-2C, the generator may be configured to generate two waveforms that are one hundred and eighty (180) degrees out of phase, but that are otherwise identical. These waveforms correspond to logic symbols Superiorθ1 (FIG. 2A) and Superiorθ2 (FIG. 2B). The absence of any waveform further corresponds to a logic symbol Inferior (FIG. 2C). Messages transmitted under the protocol include a preamble that is encoded through amplitude shift key (ASK) modulation using the Superiorθ2 and Inferior symbols and a data body that is encoded through phase reversal key (PRK) modulation using the Superiorθ1 and Superiorθ2 symbols. In particular, the preamble begins with less than two complete Superiorθ2 symbols, followed by a start bit consisting of the Superiorθ2 symbol, eight data bits with each data bit consisting of a Superiorθ2 or Inferior symbol, and a stop bit consisting of an Inferior symbol. The data body begins with a sync segment comprising five Superiorθ1 symbols, followed by one or more character segments each having a start bit consisting of a Superiorθ2 symbol, eight data bits with each data bit consisting of Superiorθ1 or Superiorθ2 symbol, a stop bit consisting of a Superiorθ1 symbol and a gap of between zero and four Superiorθ1 symbols, followed by an end of message segment consisting of five Superiorθ1 symbols.

Figure 3:
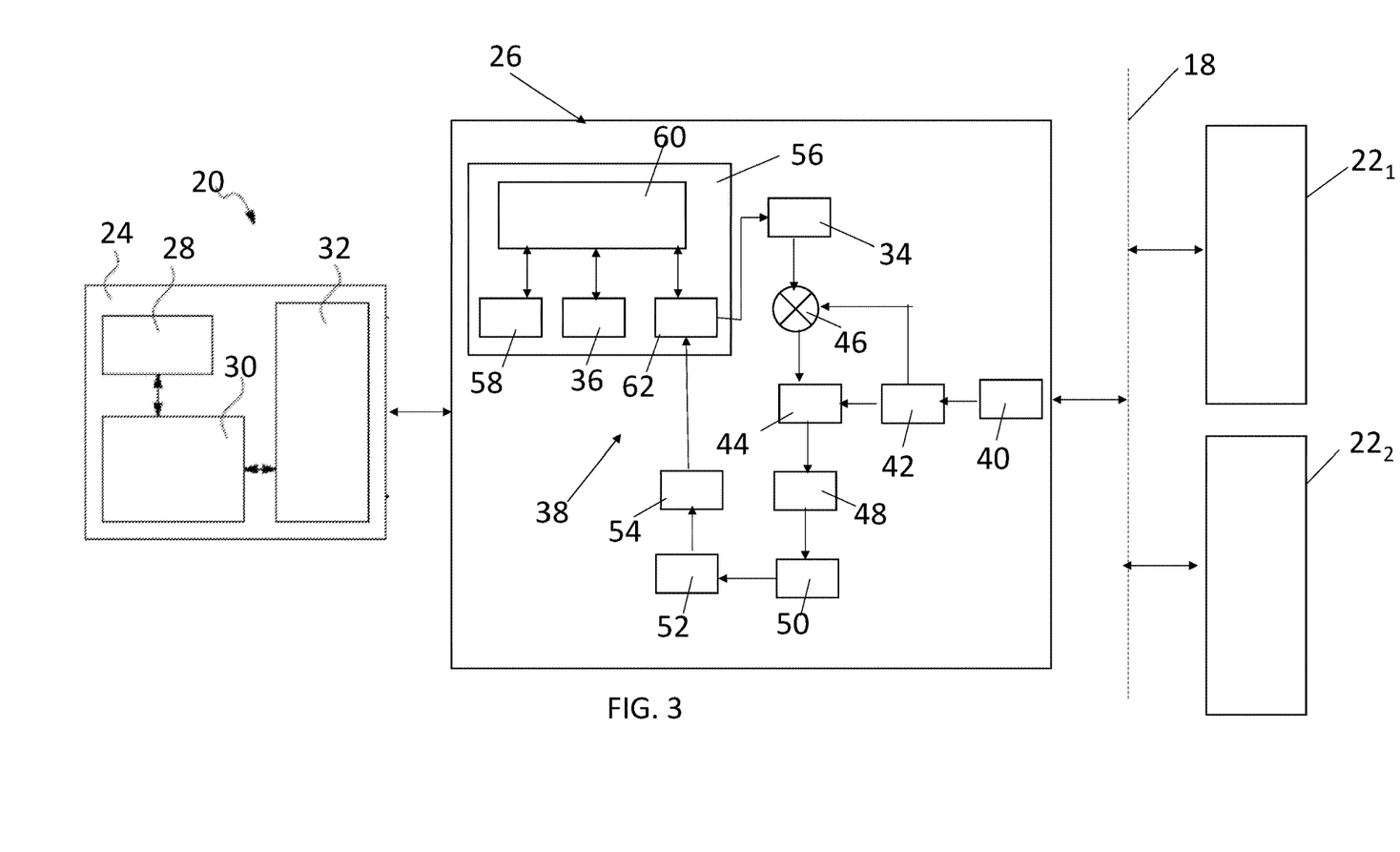
FIG. 3 is a diagrammatic view of the electronic systems of the vehicle of FIG. 1 in which one of the systems includes one embodiment of a system for demodulating and decoding received messages transmitted along the power line in the vehicle.

Referring now to FIG. 3, each system 20, 22 may include a controller 24 and a system 26 for demodulating and decoding received messages transmitted along the power line 18 in vehicle 10 in accordance with the teachings disclosed herein. Although not illustrated herein, it should be understood that each of systems 20, 22 may further include a system for encoding and modulating messages for transmission along power line 18 to other systems 20, 22.

Controller 24 may perform a variety of actions in response to received messages depending on the purpose of the system 20, 22 in which controller 24 and system 26 are employed. Controller 24 may comprise a programmable microprocessor or microcontroller or may comprise an application specific integrated circuit (ASIC). Controller 24 may include a memory 28 and a central processing unit (CPU) 30. Controller 24 may also include an input/output (I/O) interface 32 including a plurality of input/output pins or terminals through which controller 24 may receive a plurality of input signals and transmit a plurality of output signals. The input signals may include signals received from system 26 while the output signals may include signals transmitted to a system (not shown) for encoding and modulating message for transmission along power line 18 to other systems 20, 22. In the illustrated embodiment, a single controller 24 is shown. It should be understood, however, that the functionality of controller 24 described herein may be divided among multiple sub-controllers.

System 26 is provided to demodulate and decode received messages transmitted along the power line 18. System 26 may include a reference signal generator 34, a timer 36 and a demodulation and decoding circuit 38.

Reference signal generator 34 is configured to selectively generate a reference signal that is combined with portions of the received message to produce an equivalent signal (i.e., a signal conveying the same data as the message) for demodulation and decoding by circuit 38. In accordance with one aspect of the teachings herein, generator 34 may comprise a chirp generator that is configured to generate a reference signal using one of the waveforms corresponding to one of the logic symbols forming the data body of the message. In particular, in one embodiment generator 34 outputs waveforms corresponding to the logic symbol Superiorθ2 (See FIG. 2B). These waveforms may be added to the waveforms forming the message body such that each waveform in the message body corresponding to the logical symbol Superiorθ2 is amplified and each waveform corresponding to the logic symbol Superiorθ1 is cancelled thereby establishing waveforms similar to the waveforms for the Superior θ2 and Inferior logic symbols and allowing demodulation of the data body of the message in a manner similar to the preamble of the message.

Timer 36 is provided to establish times, at the direction of demodulation and decoding circuit 38, corresponding to the predetermined length or duration of the preamble and data body of the message for use in synchronizing the operation of circuit 38. The predetermined length or duration may be established by the communication protocol in use for transmitting and receiving messages along power line 18. For example, the communications protocol developed by the Society of Automotive Engineers (SAE) and set forth in the document number J2497 and titled "Power Line Carrier Communications for Commercial Vehicles" used in certain embodiments establishes the length or duration of the preamble and data body of messages transmitted under the protocol. Timer 36 is conventional in the art and may comprise a synchronous timer.

Demodulation and decoding circuit 38 demodulates and decodes messages received by the system 20 or 22 that have been transmitted by other systems 20, 22 along power line 18. Circuit 38 implements ASK demodulation of the message preamble and PRK demodulation of the message data body. Circuit 38 may include a decoupling circuit 40, a filter 42, an amplifier 44, an adder 46, a rectifier 48, a filter 50, a comparator 52, a logic inverter 54 and a controller 56. Although the specific combination, arrangement and operation of elements 40, 42, 44, 46, 48, 50, 52 and 54 in circuit 38 for the purpose described herein is believed to be inventive, the individual elements 40, 42, 44, 46, 48, 50, 52 and 54 are conventional in the art and operate in a conventional manner. Decoupling circuit 40 prevents unwanted energy from power line 18 from being passed to other elements of circuit 38. Circuit 40 may include a capacitor that couples circuit 38 to power line 18 and a clamping diode (e.g., a Zener diode) downstream of the capacitor. Filter 42 attenuates analog input signals outside of a predetermined frequency range (e.g., 100 KHz to 400 KHz) and may comprise a band pass filter. Amplifier 44 amplifies the analog signal output by filter 42 prior to delivery to rectifier 48. Adder 46 combines the reference signal output by reference signal generator 34 and the signal output by filter 42 prior to delivery to amplifier 44. Rectifier 48 converts the AC (alternating current) signal output by amplifier 44 to a DC (direct current) signal. Filter 50 attenuates signals output by rectifier 48 outside of a predetermined frequency range and may comprise a low-pass filter. Comparator 52 generates digital signals responsive to the analog signals output by filter 50. Comparator 52 compares the signal output by filter 50 to a bias signal that establishes a DC bias level. Inverter 54 inverts the digital signal output by comparator 52 prior to delivery to controller 56.

Controller 56 is provided to decode received messages transmitted along power line 18 prior to transmission to controller 24 in which the data conveyed in the message is used or the command conveyed in the message is implemented. Controller 56 may comprise a programmable microprocessor or microcontroller or may comprise an application specific integrated circuit (ASIC). In accordance with the present teachings, controller 56 may be configured with appropriate programming instructions (i.e., software or a computer program) to implement several steps in a method for demodulating and decoding received messages transmitted along power line 18 within vehicle 10 as discussed in greater detail below. Controller 56 may include a memory 58 and a central processing unit (CPU) 60. Controller 56 may also include an input/output (I/O) interface 62 including a plurality of input/output pins or terminals through which controller 56 may receive a plurality of input signals and transmit a plurality of output signals. The input signals may include signals received from inverter 54 while the output signals may include signals transmitted to reference signal generator 34 and to controller 24 of system 20 or 22. Controller 56 may further include timer 36 described hereinabove. Alternatively, timer 36 may be separate from controller 56 and controller 56 may communicate with timer 36 through I/O interface 62. In the illustrated embodiment, a single controller 56 is shown. It should be understood, however, that the functionality of controller 56 described herein may be divided among multiple sub-controllers.

Figure 4A:
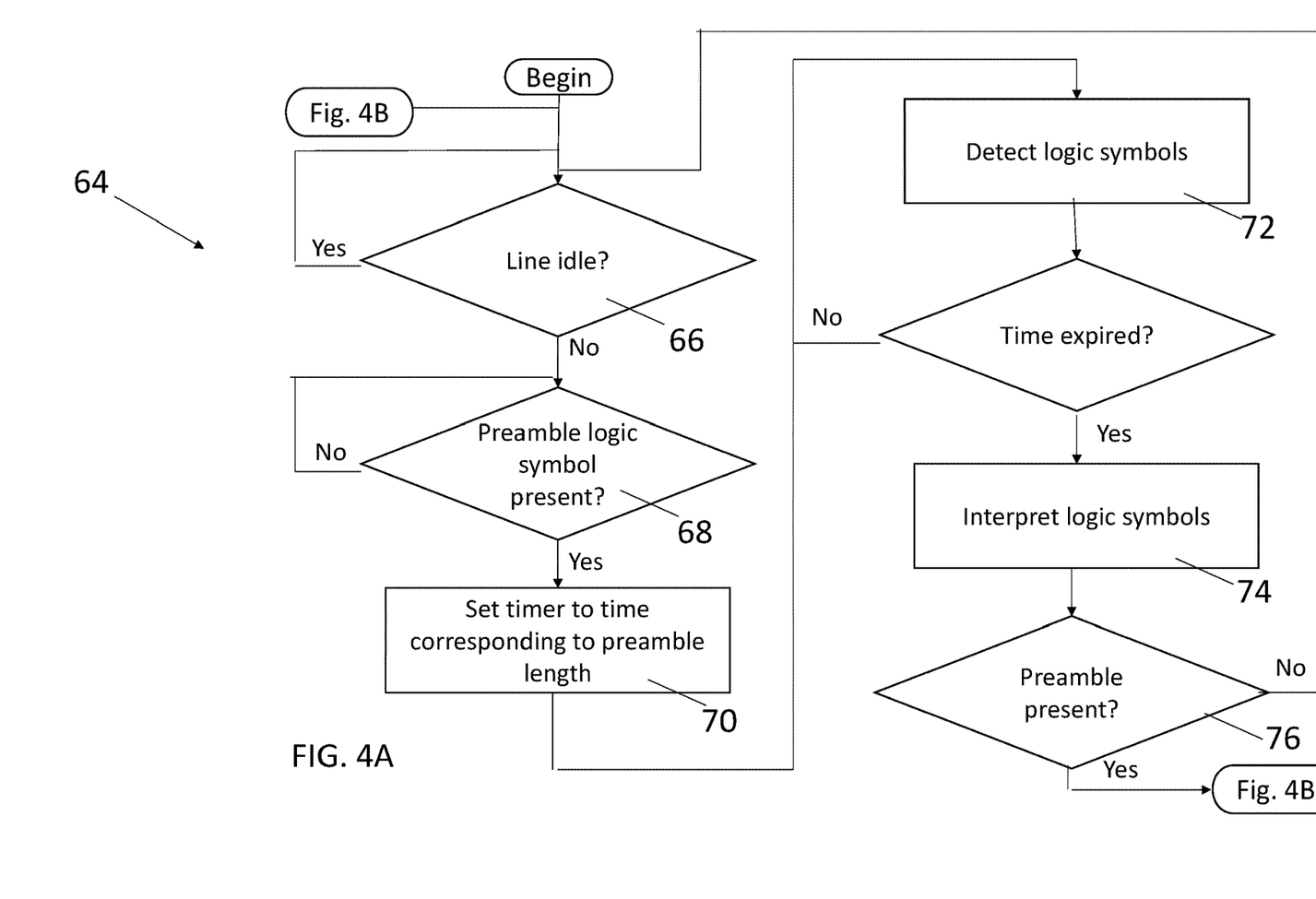
FIGS. 4A-B are flow chart diagrams illustrating one embodiment of a method for demodulating and decoding received messages transmitted along a power line within a vehicle.
Figure 4B:
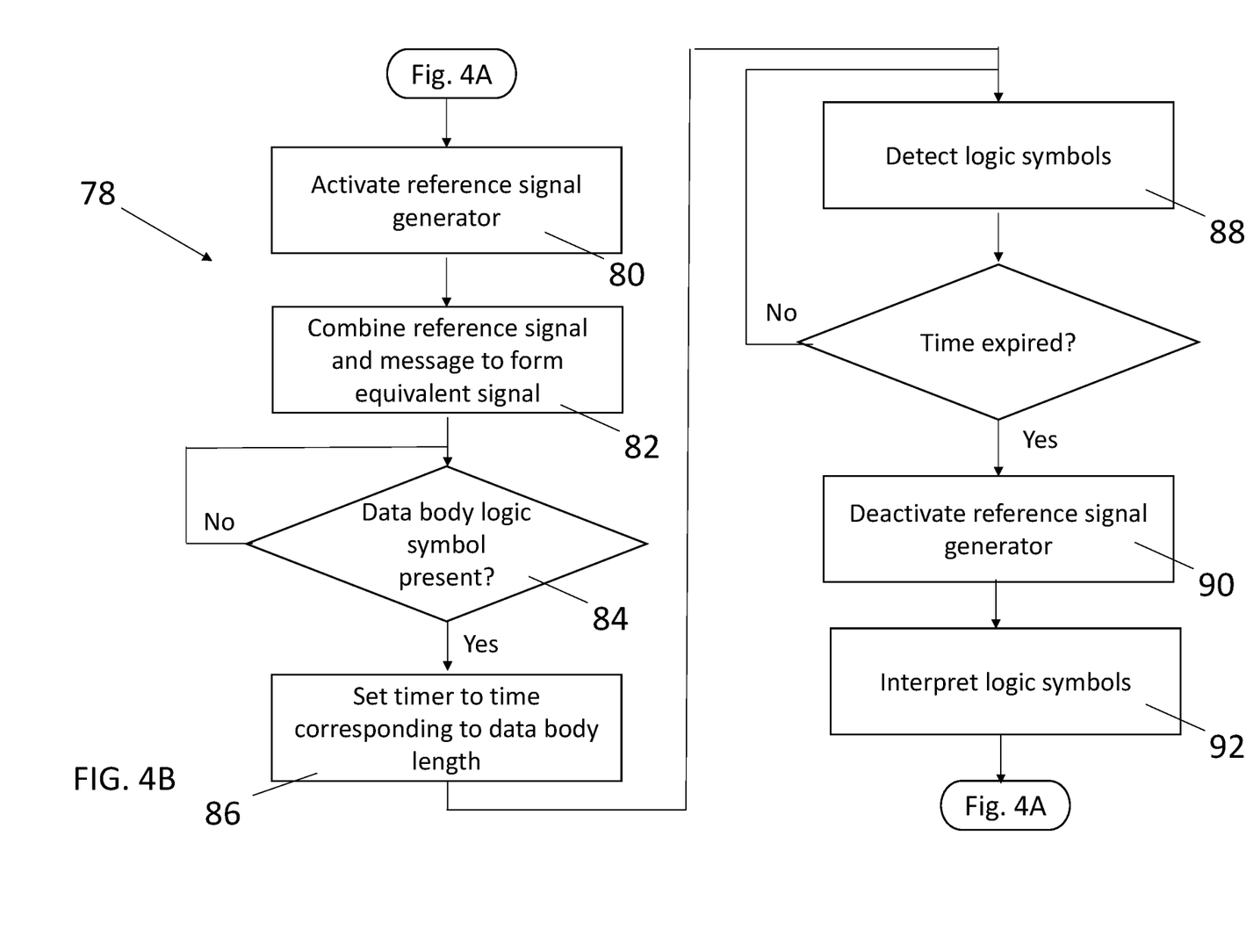

Referring now to FIGS. 4A-B, one embodiment of a method for demodulating and decoding received messages transmitted along the power line 18 within vehicle 10 is illustrated. Referring to FIG. 4A, the method may begin with the step 64 of determining whether a message is present on power line 18. Step 64 may include a number of substeps 66, 68, 70, 72, 74 and 76.

Figure 5A:
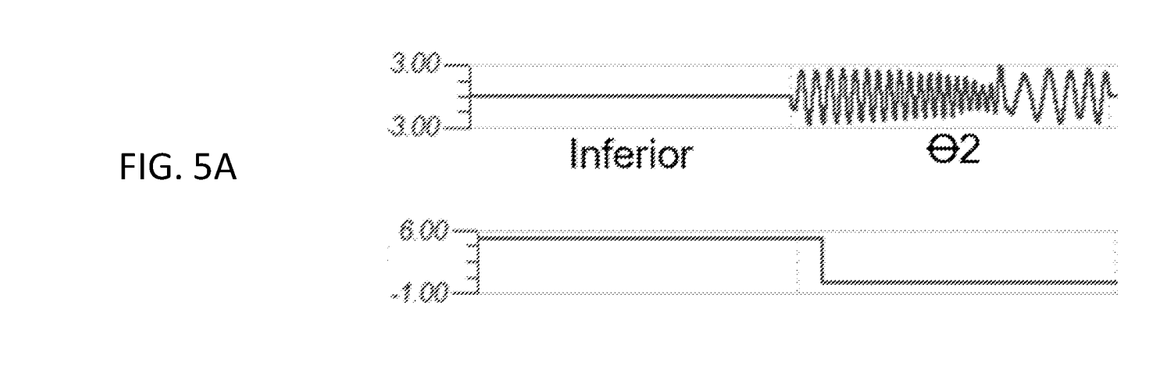
FIGS. 5A-B are diagrammatic views showing the waveforms forming the preamble and data body of a received message transmitted along a power line before and after demodulation by the system and method disclosed herein.

In substep 66, system 26 determines whether power line 18 is idle. System 26 determines whether power line 18 is idle based on the waveforms present on power line 18. In particular, when power line 18 is idle, the chirp generators used in generate waveforms corresponding to a message will not generate any chirps and the absence of any waveform on power line 18 will be indicative of an idle power line. Referring to FIG. 5A, the absence of the waveform will be will be interpreted by demodulation and decoding circuit 38 as the Inferior logic symbol (FIG. 2C) which will be demodulated by circuit 38 to a bit of logic one.

Referring again to FIG. 4A, if power line 18 is not idle (i.e., a waveform is present on power line 18), step 64 of the method may continue with substep 68 in which system 26 determines whether a logic symbol indicative of the beginning of the preamble of a message is present on power line 18. System 26 determines whether the beginning of the preamble of a message is present by detecting a logic symbol indicative of the beginning of the preamble. Referring again to FIG. 5A, in one embodiment the beginning of a preamble is indicated by a waveform corresponding to the Superiorθ2 logic symbol which demodulation and decoding circuit 38 will demodulated to a bit of logic zero.

Referring again to FIG. 4A, if system 26 detects the logic symbol indicative of the beginning of the preamble of the message, step 64 may continue with the substep 70 of initiating timer 36. Controller 56 will set timer 36 to a time corresponding to a predetermined length or duration of the preamble of the message. The predetermined length or duration is established under the communication protocol being implemented in vehicle 10 and may be stored in memory 58 of controller 56.

Step 64 may continue with the substep 72 of detecting a plurality of logic symbols on power line 18. Substep 72 will continue until the time set in substep 70 in timer 36 has expired. During this time, demodulation and decoding circuit 38 will demodulate individual waveforms received along power line 18 to generate an equivalent bit pattern for the preamble.

Once the time set in substep 70 has expired, step 64 may continue with the substeps 74, 76 of interpreting the plurality of logical symbols detected in substep 72 by decoding the bit pattern generated in substep 72 and determining whether the plurality of logic symbols is indicative of the presence of the preamble of a message. Controller 56 may be configured to determine whether the number and sequence of logic symbols detected in substep 72 corresponds to a predetermined number and sequence of logic symbols indicative of a preamble of a message. This predetermined number and sequence of logic symbols is established in accordance with the communication protocol being used and may be stored in memory 58 of controller 56. Under the J2497 standard referenced above, the preamble will consist of a plurality of Superiorθ2 and Inferior logic symbols.

If the plurality of logic symbols detected in substep 72 is not indicative of the presence of a preamble of a message, the method may return to substep 66 of step 64. Referring now to FIG. 4B, if the plurality of logic symbols detected in substep 72 does indicate the presence of a preamble of a message, the method may continue with the step 78 of extracting data from a data body of the message. Step 78 may include several substeps 80, 82, 84, 86, 88, 90 and 92.

In substep 80, controller 56 of system 26 activates reference signal generator 34. As mentioned hereinabove, generator 34 may comprise a chirp generator that is configured to generate waveforms corresponding to one of the waveforms used in forming the data body and corresponding to logic symbols Superiorθ1 and Superiorθ2. In one embodiment, generator 34 generates a waveform corresponding to logic symbol Superiorθ2.

In substep 82, the reference signal generated by generator 34 is combined (e.g., added) to the message to produce an equivalent signal (i.e., a signal conveying the same data as the message). Adder 46 of circuit 38 of system 26 may be used to combine the reference signal and message with the equivalent signal which is then provided to amplifier 44.

Figure 5B:
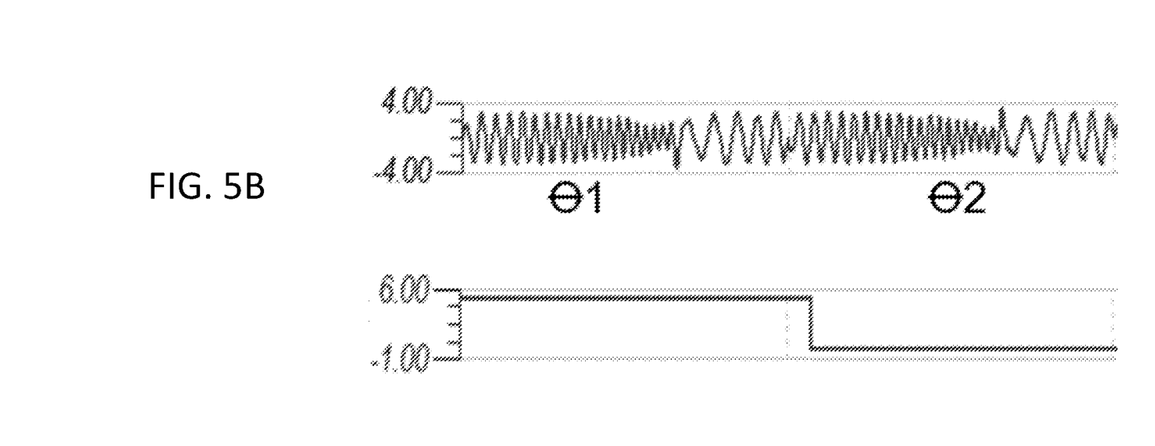

In substep 84, system 26 determines whether a logic symbol indicative of the beginning of the data body of the message is present on power line 18. System 26 determines whether the beginning of the data body of the message is present by detecting a logic symbol indicative of the beginning of the data body. Referring to FIG. 5B, in one embodiment the beginning of a data body is indicated by a waveform corresponding to the Superiorθ2 logic symbol which demodulation and decoding circuit 38 will demodulate to a bit of logic zero.

Referring again to FIG. 4B, if system 26 detects the logic symbol indicative of the beginning of the data body of the message, step 78 may continue with the substep 86 of initiating timer 36. Controller 56 will set timer 36 to a time corresponding to a predetermined length or duration of the data body of the message. The predetermined length or duration is established under the communication protocol being implemented in vehicle 10 and may again be stored in memory 58 of controller 56.

Step 78 may continue with the substep 88 of detecting a plurality of logic symbols on power line 18. Substep 78 will continued until the time set in substep 86 in timer 36 has expired. During this time, demodulation and decoding circuit 38 will demodulate individual waveforms received along power line 18 to obtain an equivalent bit pattern for the message data body.

Once the time set in substep 86 has expired, step 78 may continue with the substeps 90, 92. In substep 90 controller 56 transmits a signal to reference signal generator 34 to command generator 34 to stop generating the reference signal. In substep 92, controller 56 may determine whether the number and/or sequence of logic symbols detected in substep 88 corresponds to a predetermined number and/or sequence of logic symbols indicative of a data body of a message by decoding the bit pattern obtained in substep 78. This predetermined number and/or sequence of logic symbols is established in accordance with the communication protocol being used and may be stored in memory 58 of controller 56. Under the J2497 standard referenced above, the data body will consist of a plurality of Superiorθ1 and Superiorθ2 logic symbols. Referring to FIG. 5B, demodulation and decoding circuit 38 will demodulate the Superiorθ1 and Superiorθ2 logic symbols to bits of logic one and logic zero, respectively.

A system 26 and method for demodulating and decoding received messages transmitted along a power line 18 within a vehicle 10 in accordance the present teachings represent an improvement as compared to conventional systems and methods. In particular, the system 26 and method disclosed herein enable a vehicle to receive messages along the power line 18 without use of the typical transceiver used within the industry that is in short supply and relatively expensive While the invention has been shown and described with reference to one or more particular embodiments thereof, it will be understood by those of skill in the art that various changes and modifications can be made without departing from the spirit and scope of the invention.

What is claimed is:

1. A system for demodulating and decoding received messages transmitted along a power line within a vehicle, comprising:
 a reference signal generator configured to generate a reference signal;
 a timer; and,
 a demodulation and decoding circuit configured to
  determine whether a message is present on the power line by
   detecting a first logic symbol on the power line indicative of a beginning of a preamble of the message;
   initiating the timer responsive to detection of the first logic symbol, the timer set to a first time corresponding to a predetermined length of the preamble of the message;
   detecting, during the first time, a first plurality of logic symbols; and,
   determining whether the first plurality of logic symbols is indicative of the presence of the preamble of the message; and,
  extract data from a data body of the message if the first plurality of logic symbols is indicative of the presence of the preamble of the message by
   activating the reference signal generator;
   combining the reference signal with the message to produce an equivalent signal;
   detecting a second logic symbol in the equivalent signal indicative of a beginning of the data body of the message;
   initiating the timer responsive to detection of the second logic symbol, the timer set to a second time corresponding to a predetermined length of the data body of the message; and,
   detecting, during the second time, a second plurality of logic symbols.

2. The system of claim 1 wherein the demodulation and decoding circuit is further configured to determine whether the power line is idle prior to detecting the first logic symbol on the power line indicative of the beginning of the preamble of the message.

3. The system of claim 1 wherein the demodulation and decoding circuit is further configured to deactivate, at the end of the second time, the reference signal generator.

4. The system of claim 1 wherein the reference signal generator comprises a chirp generator.

5. The system of claim 1 wherein the message is encoded using chirp spread spectrum modulation.

6. The system of claim 1 wherein the preamble of the message is encoded through amplitude shift key modulation and the data body of the message is encoded through phase reversal key modulation.

7. The system of claim 1 wherein the data body of the message is formed using first and second waveforms that are 180 degrees out of phase with one another and the reference signal is formed using one of the first and second waveforms.

8. The system of claim 1 wherein the first symbol is different than the second symbol.

9. The system of claim 8 wherein the first symbol is formed by a first waveform and the second symbol is formed by a second waveform that is 180 degrees out of phase with the first waveform.

10. A method for demodulating and decoding received messages transmitted along a power line within a vehicle, comprising:
    determining whether a message is present on the power line by
        detecting a first logic symbol on the power line indicative of a beginning of a preamble of the message;
        initiating a timer responsive to detection of the first logic symbol, the timer set to a first time corresponding to a predetermined length of the preamble of the message;
        detecting, during the first time, a first plurality of logic symbols; and,
        determining whether the first plurality of logic symbols is indicative of the presence of the preamble of the message; and,
    extracting data from a data body of the message if the first plurality of logic symbols is indicative of the presence of the preamble of the message by
        activating a reference signal generator configured to generate a reference signal;
        combining the reference signal with the message to produce an equivalent signal;
        detecting a second logic symbol in the equivalent signal indicative of a beginning of the data body of the message;
        initiating the timer responsive to detection of the second logic symbol, the timer set to a second time corresponding to a predetermined length of the data body of the message; and,
        detecting, during the second time, a second plurality of logic symbols.

11. The method of claim 10, wherein determining whether the message is present on the power line includes determining whether the power line is idle prior to detecting the first logic symbol on the power line indicative of the beginning of the preamble of the message.

12. The method of claim 10, further comprising deactivating the reference signal generator at the end of the second time.

13. The method of claim 10 wherein the reference signal generator comprises a chirp generator.

14. The method of claim 10 wherein the message is encoded using chirp spread spectrum modulation.

15. The method of claim 10 wherein the preamble of the message is encoded through amplitude shift key modulation and the data body of the message is encoded through phase reversal key modulation.

16. The method of claim 10 wherein the data body of the message is formed using first and second waveforms that are 180 degrees out of phase with one another and the reference signal is formed using one of the first and second waveforms.

17. The method of claim 10 wherein the first symbol is different than the second symbol.

18. The method of claim 17 wherein the first symbol is formed by a first waveform and the second symbol is formed by a second waveform that is 180 degrees out of phase with the first waveform.

* * * * *